United States Patent [19]

Munoz

[11] Patent Number: 5,601,509
[45] Date of Patent: Feb. 11, 1997

[54] TAPER ROLLER CONTINUOUSLY VARIABLE TRANSMISSION

[75] Inventor: Carlos Munoz, Placentia, Calif.

[73] Assignee: Nissan Research & Development, Inc., Farmington Hills, Mich.

[21] Appl. No.: 495,706

[22] Filed: Jun. 27, 1995

[51] Int. Cl.⁶ ................................................. F16H 15/42
[52] U.S. Cl. ................................................................ 476/53
[58] Field of Search ............................... 475/193; 476/53

[56] References Cited

U.S. PATENT DOCUMENTS

| | | | |
|---|---|---|---|
| 1,868,676 | 7/1932 | Stoeckicht | 476/53 |
| 2,089,003 | 8/1937 | Sack | 476/53 |
| 3,043,149 | 7/1962 | Davin et al. | 476/53 |
| 3,224,285 | 12/1965 | Maichen | 476/53 |
| 4,229,985 | 10/1980 | Borello | 74/192 |
| 5,217,418 | 6/1993 | Fellows et al. | 475/214 |

*Primary Examiner*—Dirk Wright
*Attorney, Agent, or Firm*—Foley & Lardner

[57] ABSTRACT

The present invention is a self-aligned continuously variable transmission between an input shaft having a first axis of rotation and an output shaft having a second axis of rotation which is parallel to the first axis of rotation. The CVT comprises a first set of cones tapered in a first direction and a second set of cones tapered in a second direction opposite to the first direction. Each cone of the first and second sets of cones has an axis of rotation oriented such that a portion of a surface thereof is parallel to a portion of the surface of each of the other cones in the same set. A power transfer ring tractionally engages the first and second sets of cones on the parallel portions thereof to transfer power from said first set of cones to the second set of cones. The power transfer ring is movable axially of said first and second sets of cones along the parallel portions to vary the speed ratio from the first set of cones to the second set of cones. The input shaft is in operative driving engagement with the first set of cones to cause rotation of the first set of cones when the input shaft rotates. The second set of cones is in operative driving engagement with the output shaft to cause rotation of the output shaft when the second set of cones rotates.

22 Claims, 6 Drawing Sheets

Section A-A

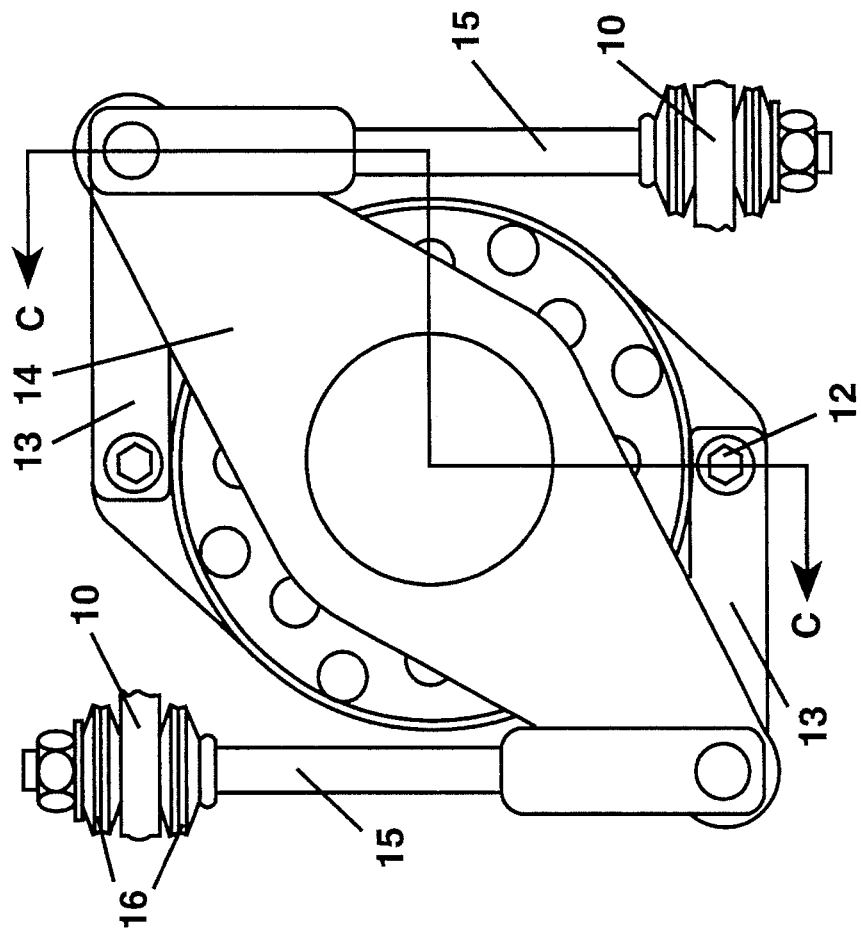
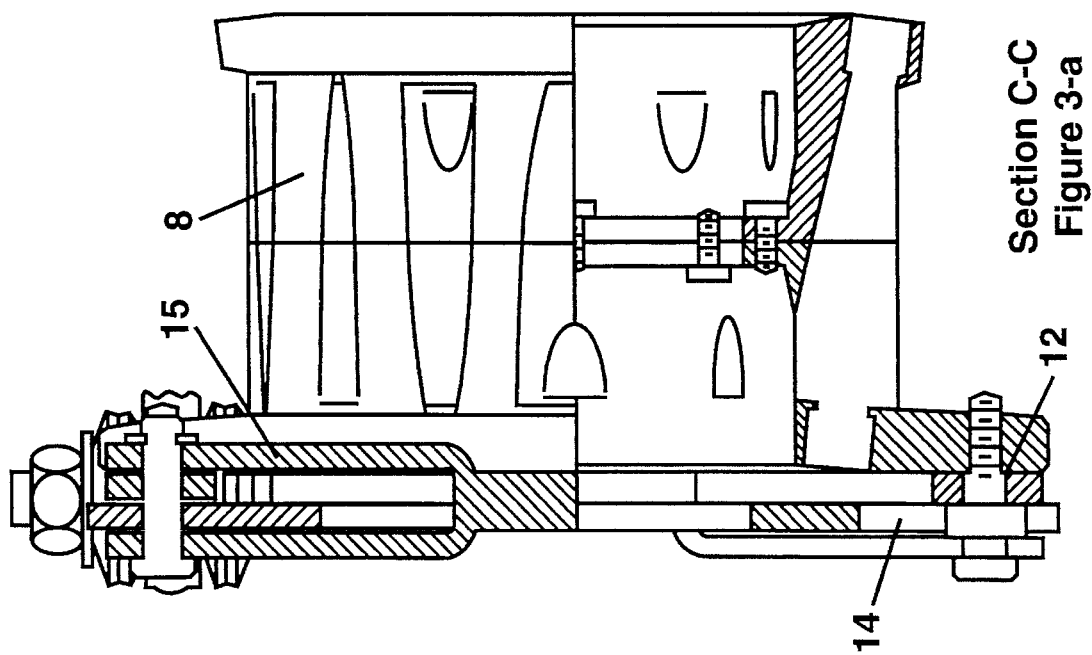
Figure 3
Section C-C
Figure 3-a

TAPER ROLLER CONTINUOUSLY VARIABLE TRANSMISSION

FIELD OF THE INVENTION

This invention relates to transmissions and more specifically to a continuously variable transmission (CVT), that is to say a transmission capable of continuous or stepless variation of the transmitted ratio.

BACKGROUND OF THE INVENTION

Continuously variable transmissions (CVTs) of the traction type are a common feature in engineering textbooks because their conceptual simplicity has a strong academic value. In practice, however, CVTs have many drawbacks which severely limit their applications. The typical CVT configurations (and the actual devices) include roll-torus (Matron Instruments, Inc.), planetary discs (Dodge Co.), planetary cones (Graham Company), spherical rollers (Cleveland Gear Company), and variable pulley with trapezoidal belt (Lewellen Manufacturing Corporation) according to Wilson, Sadler and Michels *Kinematics and Dynamics of Machinery*. Of all these configurations, only the variable pulley CVT has succeeded as a viable automobile application in the Subaru Justy (equipped with the smallest engine) in the USA.

The main disadvantage of CVT's is their low power capacity caused by power flow through a single point of contact. Attempts to increase the power paths to two or three have resulted in inexact control that tends to lock the device, lose power by slippage, and accelerate its wear. The variable pulley type has partially resolved this limitation, by replacing the single point of transfer by an arc of transfer, but for automobile applications it requires complex control, and a torque converter with its inherent loses.

One example of a known CVT is shown in U.S. Pat. No. 5,217,418 which pertains to a two-step toroidal CVT in which there are three points of power transfers per stage, each of which must be controlled separately. The transmission comprises two connected and oppositely facing discs and two sets of rollers to transmit drive between the discs. This type of transmission requires precise computer control which increases the expense of the device.

Another type of CVT is shown in U.S. Pat. No. 4,229,985. This transmission employs combinations of the following shapes: cones, internally tapered sleeves, dual faced internally tapered sleeves, and a combination of a dual faced internal wheel with a dual faced external shape. The primary purpose of the shapes and the manner in which they engage in traction is to achieve a matched geometry between the contacted rolling components, to increase the contacting surface areas, to engage each other in a point to point relationship, and to maintain a narrow or small difference between the largest diameter of any of the rolling components of the drive and the smallest diameter of any of the rolling components of the drive.

Many other CVT configurations have been suggested. However, none achieves the combination of high power capacity, efficiency, low cost and durability which is necessary for wide commercial acceptance.

SUMMARY OF THE INVENTION

The present invention is a self-aligned continuously variable transmission which includes an input shaft having a first axis of rotation and an output shaft having a second axis of rotation which is aligned with the first axis of rotation. The CVT comprises a first set of cones tapered in a first direction and a second set of cones tapered in a second direction opposite to the first direction. Each cone of the first and second sets of cones has an axis of rotation oriented such that a portion of the surface of each cone is parallel to a portion of the surface of the other cones. A power transfer ring tractionally engages the first and second sets of cones on the parallel portions thereof to transfer power from said first set of cones to the second set of cones. The power transfer ring is movable axially of said first and second sets of cones along the parallel surfaces to vary the rotational speed ratio from the first set of cones to the second set of cones. The input shaft is in operative driving engagement with the first set of cones to cause rotation of the first set of cones when the input shaft rotates. The second set of cones is in operative driving engagement with the output shaft to cause rotation of the output shaft when the second set of cones rotates.

In one embodiment of the invention, the parallel surfaces of the first set of cones describe a cylinder and the parallel surfaces of the second set of cones describe the same cylinder.

In accordance with another embodiment of the invention, the parallel surfaces of the first set of cones describe a first cylinder and the parallel surfaces of the second set of cones describe a second cylinder having a diameter different from the diameter of the first cylinder.

In one variation, the first set of cones is axially spaced from the second set of cones and the power transfer ring has a first contact surface in contact with the first set of cones and a second contact surface in contact with the second set of cones, and the first and second contact surfaces form equal diameter circles.

In another form, the power transfer ring has a single circular contact surface which tractionally engages both the first set of cones and the second set of cones.

In another alternative construction, the first and second sets of cones are radially aligned and the power transfer ring has an inner surface which tractionally engages one of the sets and an outer surface which tractionally engages the other of the sets.

In yet another form of the invention, the first and second sets of cones are radially offset and axially offset and the power transfer ring has two offset contact surfaces.

In the preferred embodiment of the invention, a first disc having a tapered race is attached to the input shaft and a second disc having a tapered race is attached to the output shaft. The tapered rollers comprise cones with a base edge. The base edges of the first set of cones tractionally engage the race of the first disc and the base edges of the second set of cones tractionally engage the race of the second disc. The discs are biased toward one another to self align the cones of the transmission.

The first and second sets of cones may be mounted in a carrier. In one embodiment, the carrier is a cage fixedly mounted and the power transfer ring is allowed to rotate to transfer power from one set of rollers to the other. In another embodiment, the carrier is a cage rotatably mounted and the power transfer ring is held against rotation.

BRIEF DESCRIPTION OF THE DRAWINGS

The details of the present invention will become more clearly understood from the detailed description set forth below, taken in conjunction with the drawings, in which:

FIG. 2a is an exploded view of the circled portion of FIG. 2 showing the contact surfaces of one tapered roller and one disc;

FIG. 2b is a sectional view taken along section line B—B of FIG. 2;

FIG. 2c shows the contact surfaces of the power transfer ring and one tapered roller;

FIG. 3 is a front view of the cage and link arrangement;

FIG. 3a shows a sectional side view taken along section line C—C of FIG. 3.

DETAILED DESCRIPTION OF THE PREFERRED EMBODIMENTS

The CVT of the present invention, as shown in FIGS. 1–3a, comprises a plurality of identical taper rollers 5 and 6 which transfer power from an input shaft 1 to an output shaft 2. One of the principal features of the invention is that the power handling capacity of the CVT can be adapted to many different applications by altering the design of the transmission to increase or decrease the number of taper rollers 5, 6.

Figure 1A:
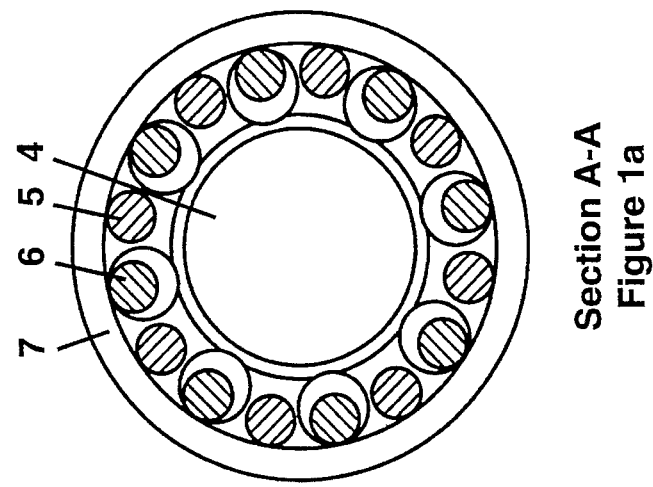
FIG. 1a is a sectional view taken along section line A—A of FIG. 1.
Figure 1:
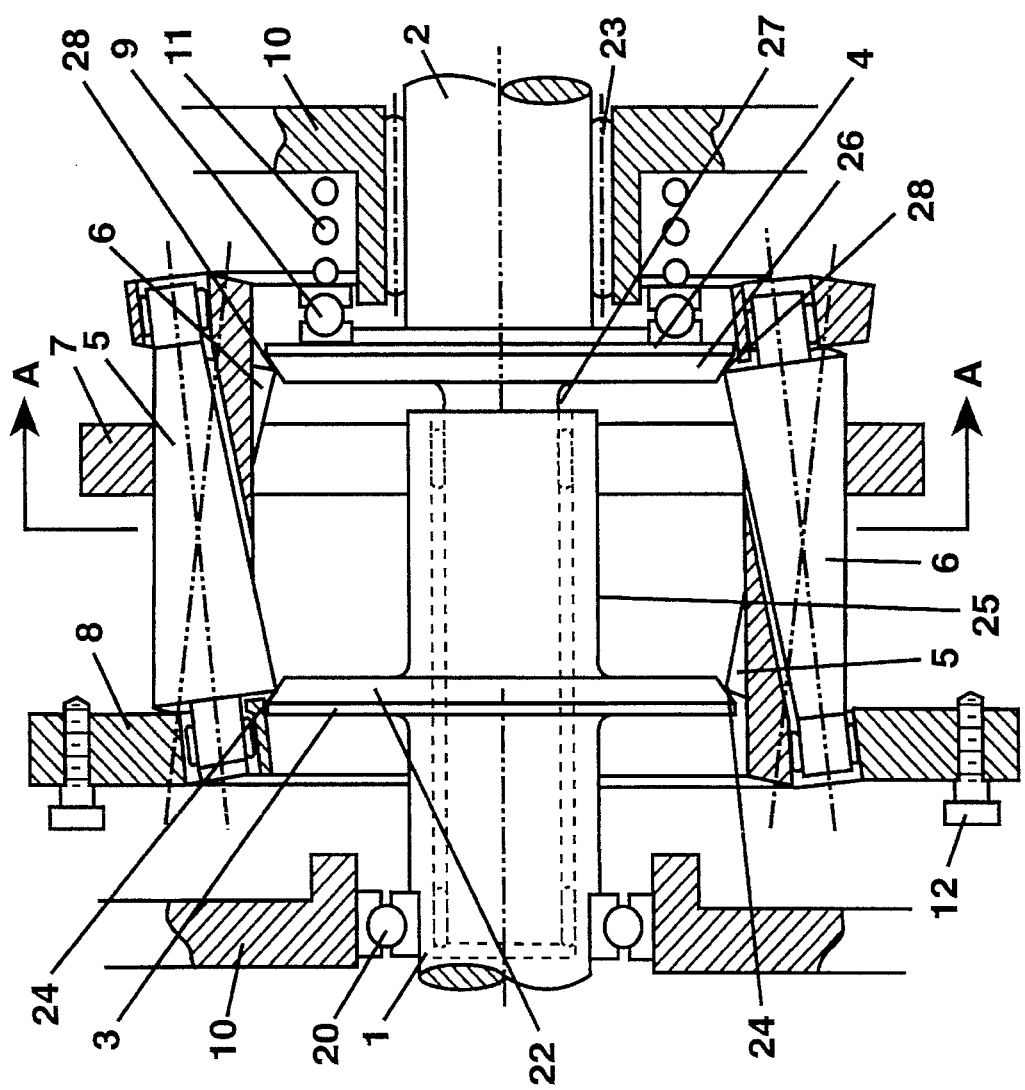
FIG. 1 is a partially fragmented view showing the relationship of the components of a first embodiment of the CVT of the present invention.
Figure 2:
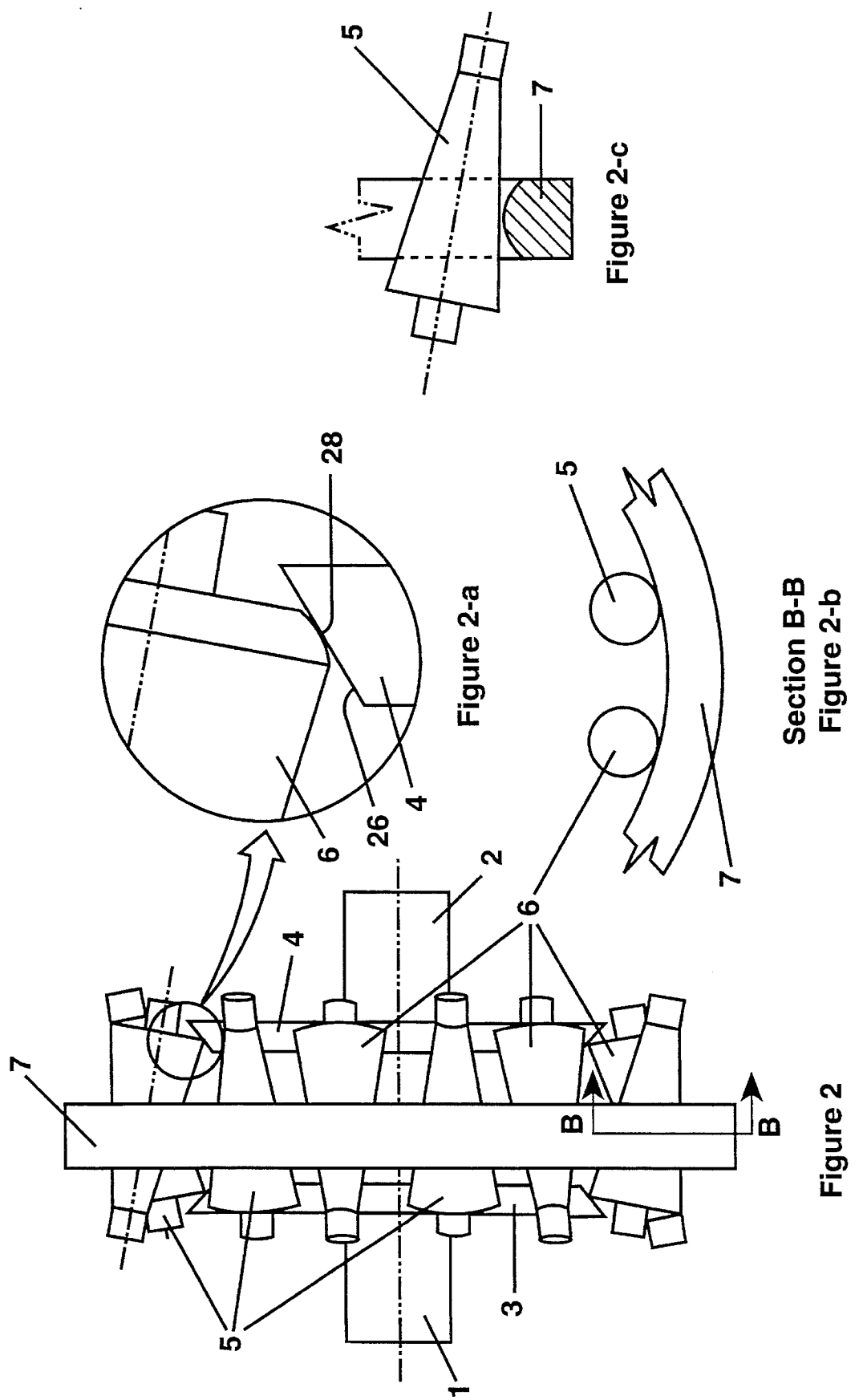
FIG. 2 is a simplified view of the first embodiment of the present invention in which the case, all supporting bearings, the cage and the spring have been omitted to focus on the nature of the contact surfaces.

With reference to FIGS. 1–2c, it will be seen that the first embodiment of the CVT of the present invention comprises input shaft 1 and output shaft 2 which are axially aligned. Output shaft 2 includes an extension 27 which has a diameter less than that of the main portion of the shaft. Input shaft 1 includes an extension 25 having a cavity receding beyond input disk 3 which telescopically receives the extension 27 of output shaft 2. Optionally, a bearing can be mounted between the input and output shafts in order to maintain this alignment. For example, FIG. 6, which shows an alternate embodiment of the invention, shows the input shaft 1 received in and journalled relative to output shaft 2 to maintain alignment, as will be discussed in greater detail below. Such an alignment arrangement may be used in any of the embodiments discussed herein.

An input disk 3 is part of the input shaft 1 and rotates with the input shaft. The input shaft 1 and disk 3 rotate on and are axially constrained by bearings 20 attached to a case 10 (partially shown).

The input disk 3 has an outer conical race 22 which may be at an angle in the vicinity of 45 degrees to the rotational axis of the disk. The race 22 is in contact with the base edge surface 24 of a first set of taper rollers 5. Because of this contact, the base edge 24 of each roller and the race 22 are highly stressed and should be hardened or formed of a hard material which is designed to withstand such stress, such as metal carbide or ceramic, in order to improve the durability of these components.

An output disk 4 is part of the output shaft 2 and rotates on a roller bearing 23. Unlike input shaft 1, output shaft 2 is not axially constrained, for reasons which will become apparent below. The output disk 4 has an outer conical race 26 in contact with the base edges 28 of a second set of taper rollers 6. Base edges 28 and race 26 should also be hardened.

Taper rollers 5 and 6 are held in position by a carrier. In FIG. 1, the carrier comprises a cage 8. Taper rollers 5 are evenly spaced around the disk 3 and held in position within the cage 8 so that their base edges make driving contact the input disk 3 on its conical outer race 22. The taper rollers 5 are radially restrained in the cage 8 by roller bearings 21 at both ends.

The taper rollers 6 are located in alternating positions relative to taper rollers 5 within cage 8. However, taper rollers 6 are arranged with their tapers opposite to taper rollers 5 so that the base edges of taper rollers 6 are in driving contact with the output disk 4 on its conical race 26. The taper rollers 6 are also mounted in cage 8 on roller bearings 21 on both ends.

As is apparent from the foregoing, the power transfer capability of the CVT of the invention is dependent upon the number of rollers 5 and 6, as well as the diameter of the disks 3 and 4, since these are the primary power transfer elements. As shown in FIG. 1a, there are eight rollers 5 and eight rollers 6. The number of rollers used in a specific application, however, would be dependent upon the power requirements of that application. The roller size and length are not related to the power handling capability of the transmission. Hence, in order to increase the power transfer capability of the transmission, a larger number of smaller diameter rollers (within the contact stress limits) could be used, for example. On the other hand, a larger number of rollers of the same size could be used by increasing the diameter of the input an output disks 3 and 4. These are examples of modifications which are possible with the present invention. Clearly numerous other changes are possible to meet the requirements of a particular user.

A power transfer ring 7 envelopes all the taper rollers 5 and 6 and contacts each in a single point along its outer surface. The power transfer ring transfers power from the rollers 5 to the rollers 6. The contact surface of the power transfer ring 7 should be toroidal in shape, as shown in FIG. 2c. This shape provides for a good contact between the ring 7 and rollers 5 and 6, and also allows the ring to easily be displaced axially along the rollers, as will be discussed below. The contact points describe a circle whose center is on the axis of rotation of the input and output shafts.

As can be seen in FIG. 1, the taper rollers 5 have their axes of rotation angled relative to the axis of rotation of input shaft 1 and output shaft 2 such that the outer surface of these rollers describe a cylinder which has it axis concentric with shafts 1 and 2. Rollers 6 have their axes of rotation angled in an opposite direction so that their outer surfaces describe the same cylinder. Power transfer ring 7 can slide along this cylinder to change the power transfer ratio between rollers 5 and 6, as would be apparent to one of ordinary skill in the art.

A spring 11 is mounted between an axial bearing 9 attached to the disk 4 and the case 10. Spring 11 applies an axial force to output disk 4 and generates all the contact forces as well as the required alignment of the taper rollers for kinematic consistency. Spring 11 biases disc 4 toward disc 3 such that the conical race of disc 3 produces axial as well as radial forces on the base edges of rollers 6 thereby aligning the rollers 6 relative to the disc 4 and producing an optimum contact force. Cage 8 is constrained against rotation relative to case 10, but allowed to move axially relative to the case 10, as explained in more detail below. In this configuration, the force of spring 11 is transferred through rollers 6 to cage 8 and then to rollers 5 forcing rollers 5 against the conical race 22 of disc 3, thereby aligning rollers 5 properly with respect to disc 3 and providing the contact force between these elements.

Cage 8 which contains all the taper rollers 5, is suspended by a set of links 13, 14, and 15 arranged in the form of a pantograph. Links 13 connect the pantograph to cage 8 via bolts 12. Links 15 connect the pantograph to case 10 via bellville springs 16 to provide cage 8 torsional resiliency. The pantograph arrangement prevents rotation of the cage 8, but is otherwise free floating. See FIGS. 3 and 3a.

In operation, cage 8 is rotationally constrained to the case 10. Therefore the rotation of the input shaft 1 and disk 3 causes the taper rollers 5 to rotate in a direction opposite to the input shaft 1 by the action of the traction forces generated at the points of contact long race 22 and the base edges 24 of the rollers. The rotation of rollers 5 causes the transfer ring 7 to rotate in the same direction as rollers 5. Ring 7 in turn causes taper rollers 6 to rotate in the same direction as rollers 5 and ring 7. Finally, rollers 6 cause output disk 4 and output shaft 2 to rotate in a direction opposite to the rotation of the taper rollers 6, which is the same direction of rotation as the input shaft 1. Overall both input and output shafts rotate in the same direction and the ratio of their speeds can be varied continuously by axially displacing the power transfer ring 7. The resilient support of cage 8 provides the CVT the capability to absorb transient overloads.

As shown, the CVT of the present invention provides a continuous range of forward speeds. If reverse speeds and geared neutral are also desired, a conventional planetary gear arrangement with split torque can be added after output shaft 2.

The power transfer ring 7 may be mounted in a carrier, as is known in the art, and moved by a speed adjustment screw such as shown FIG. 9 of U.S. Pat. No. 4,229,985. Movement of the power transfer ring 7 axially along rollers 5 and 6 changes the ratio of the diameters of the rollers at the point of contact of the power transfer ring and thereby changes the speed ratio of the transmission. As is apparent from FIG. 1, when ring 7 is at its leftmost position relative to the figure, the highest transmission ratio is achieved. Ring 7 is moved to the right to reduce the transmission ratio.

In an alternate embodiment, cage 8 may be left free to rotate. In this configuration, power transfer ring 7 is mounted on splines or the like which restrain ring 7 from rotating but allow ring 7 to move axially to control the output rotational speed.

In the embodiment shown in FIG. 1, the device has symmetrical components for simplicity (rollers 5 identical to rollers 6 and disk 3 identical to disk 4), and the speed ratio range of operation is:

CVT speed ratio range: r/R to R/r where R and r are taper roller maximum and minimum working radii. This arrangement can accommodate rotational speed ranges such as ⅓ to 3 (1:9). Naturally, very wide speed ranges, although kinematically feasible, may have less power capacity than narrower speeds ranges. Additionally, further speed reductions (or increases) are possible by use of non-symmetrical components. For example, rollers 5 may be a different size than rollers 6 and disks 3 and 4 may have different diameters from each other.

As shown in FIG. 1, spring 11 provides all the contact forces and makes the transmission self-aligning. If desired, spring 11 could be replaced by a hydraulic device that varies the contact force in proportion to the transmitted torque. Bellville springs may replace helical type.

FIG. 2 is a simplified view of the first embodiment of the present invention in which the case 10, all supporting bearings, cage 8 and spring 11 have been omitted to focus on the nature of the surfaces in contact.

In the case of the contact between the taper rollers and either disk 5 or 6, traction forces are developed as shown on the exploded FIG. 2-a by contact between the base edges 28 of rollers 6 and the conical race 26 of the disc 4. A similar arrangement for input disk 3 and rollers 5 provides contact for traction forces rollers 5. As can also be seen by reference to FIG. 2a, an axial force on disc 4, as applied, for example, by spring 11 of FIG. 1, will control the contact force and compensate for wear of the edge 28 and the conical race 26. The edge 28 may be toroidal in shape as is shown in FIG. 2a.

The contact between the taper rollers 5 and 6, and the transfer ring 7 is shown on FIG. 2-b and FIG. 2-c. As seen in these figures, the transfer ring 7 has an inner race of toroidal shape which contacts each roller on its conical surfaces in a single point. This point contact can be moved axially along the rollers in order to alter the transfer ratio, as discussed above.

The transmission case can also be filled with a traction fluid to improve the torque capacity of the device and dissipate heat generation at the contact points.

The CVT of the present invention has the following advantages over prior designs:

1. Low manufacturing cost through the use of a plurality of identical rollers and a plurality of identical disks;
2. Compact size and low weight;
3. High power transfer capability resulting from a multiplicity of power paths, which can be increased as needed. The power and torque transfer capacity increases with the number of rollers and disk diameter;
4. The parts are self aligning;
5. The device self adjusts to compensate for wear, and retains its original function;
6. The most stressed components are the taper rollers (have the highest contact point convexity), which are the easiest to harden;
7. The device is capable of absorbing transients and capable of zero back lash; and
8. Quiet operation compared with geared transmissions.

Figure 4:
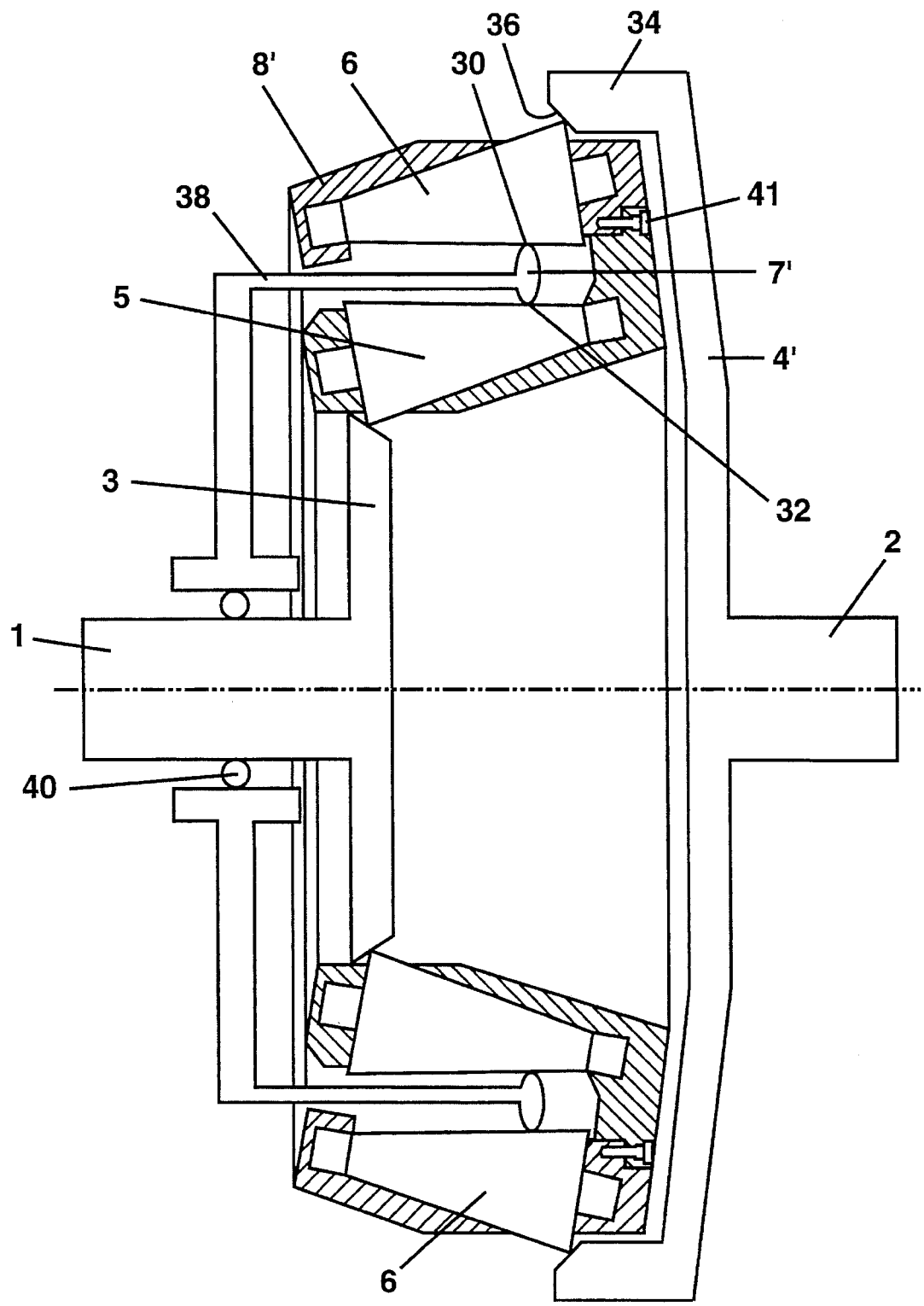
FIG. 4 shows a second embodiment of the present invention.

A second embodiment of the invention is shown in FIG. 4 in which like components are represented with like reference numerals. The embodiment of FIG. 4 uses the same basic components as the first embodiment (FIG. 1) but is reconfigured so that the rollers 5 and 6 are paired as shown, or alternately aligned with the power transfer ring 7' between them. In this embodiment, the outer surface of rollers 5 define a first cylinder and the inner surface of rollers 6 define a second cylinder. Both sets of rollers are mounted in a cage 8'. As with the embodiment of FIG. 1, cage 8', may be held against rotation relative to the case 10 (not shown in FIG. 4). The power transfer ring 7' is attached to an extension 38 and is mounted for rotation on the shaft 1 through bearings 40.

Power transfer ring 7' contains two contact surfaces 30 and 32. Contact surface 30 faces radially outward to contact the inner surfaces of the rollers 6 and surface 32 faces radially inward to contact the outer surface of rollers 5. Because there are two contact surfaces facing in opposite directions, ring 7' experiences compression forces between the outer and inner sets of rollers. Thus, ring 7' would not experience the same flexural stresses as ring 7 of the first embodiment and could have a smaller cross section than ring 7. However, in this configuration, extension 38 is required in order for the ring 7' to be operated from outside the rollers to change speed ratios.

As described in connection with FIG. 1, as an alternate to the configuration in FIG. 4 in which the cage 8' is held against rotation, the ring 7' can be held against rotation and the cage 8' allowed to rotate. In this alternative, the power transfer ring 7' would be mounted on a spline or the like to permit axial movement without allowing the ring 7' to rotate. This same option exists with each of the embodiments described herein.

The output disk 4' of FIG. 4 is shaped differently than the input disk 3. Disk 4' is larger that disk 3 and includes a cylindrical flange 34 which has an inwardly facing conical race 36. The disk 4' contacts rollers 6 on its inner conical race 36 thereby improving traction and provides an additional speed reduction because of the larger diameter of disk 4' relative to the input disk 3.

The cage 8' is formed in two sections fastened by bolts 41 and can be taken apart to facilitate roller and transfer ring insertion. See FIG. 4. The contact surfaces are similar to the first embodiment.

Figure 5:
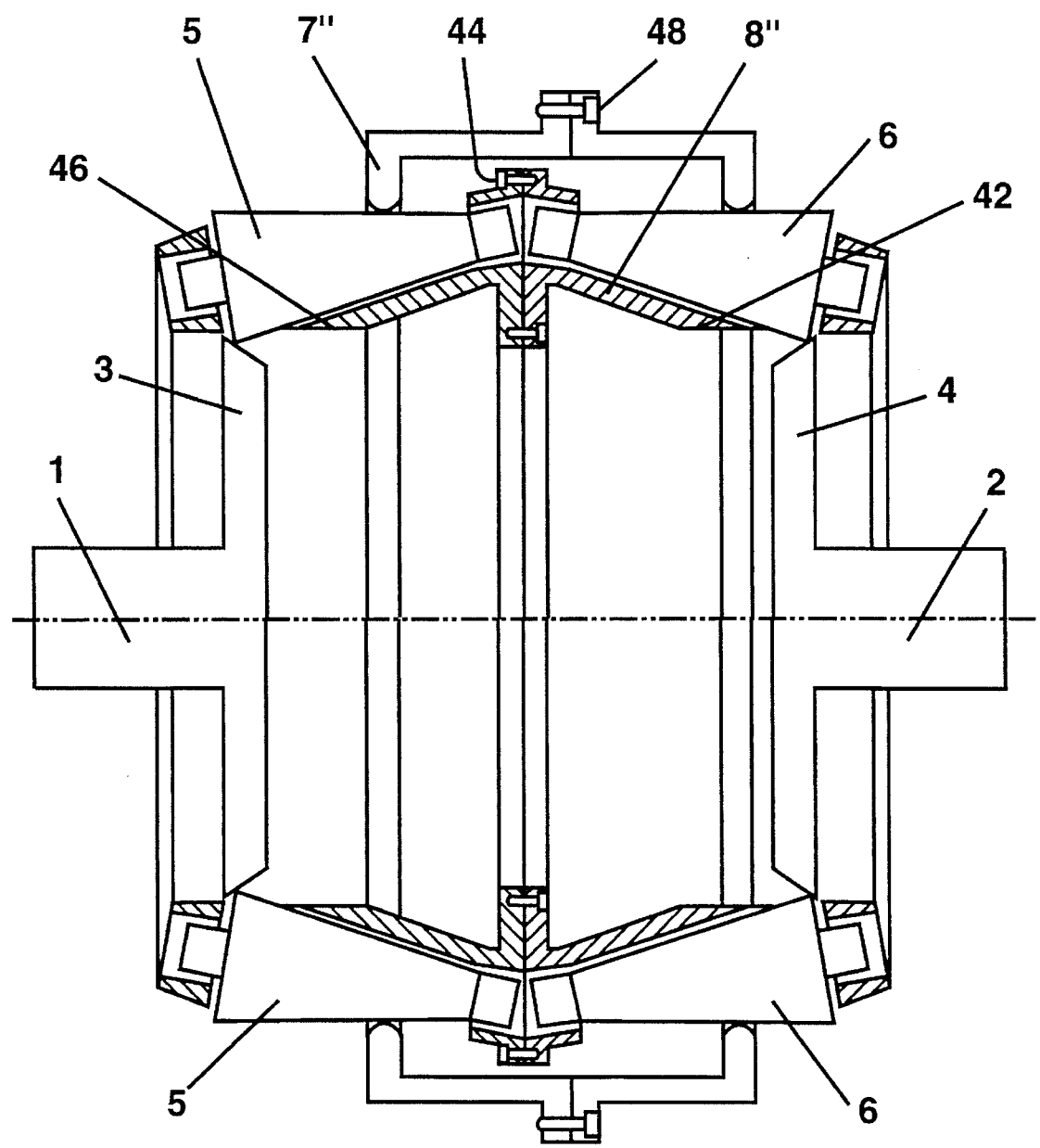
FIG. 5 shows a third embodiment of the present invention.

A third embodiment of the CVT of the present invention is shown in FIG. 5. The embodiment of FIG. 5 also uses the same basic components as the first embodiment (FIG. 1), which are identified with the same reference numerals. However, in this embodiment, the rollers 5 and 6 are positioned in a linearly opposed relationship to each other as shown (or alternately opposed). The transfer ring 7" has two contact races which both face radially inward, in order to contact the two sets of rollers. All contact surfaces are essentially identical to the first embodiment.

In the embodiments of FIGS. 4 and 5, the power transfer rings, 7' and 7" respectively, are inherently stable because they have two axially spaced contact surfaces holding the rings perpendicular to axis of shafts 1 and 2. In other words, the transfer rings 7' and 7" do not require a restraining system to keep them perpendicular to the input and output shaft axes. Therefore, speed ratios can be changed by pushing the transfer ring at any single point. In the embodiment of FIG. 1, on the other hand, the transfer ring 7 should be constrained to ensure that it will maintain its orientation when being moved.

To facilitate assembly, the cage 8" needs to be of split construction as shown on FIG. 5. The cage 8" comprises two members 46 and 42 which are attached by bolts 44. Additionally, the transfer ring 7" is formed in two pieces fastened by bolts 48 as shown in FIG. 5.

Figure 6:
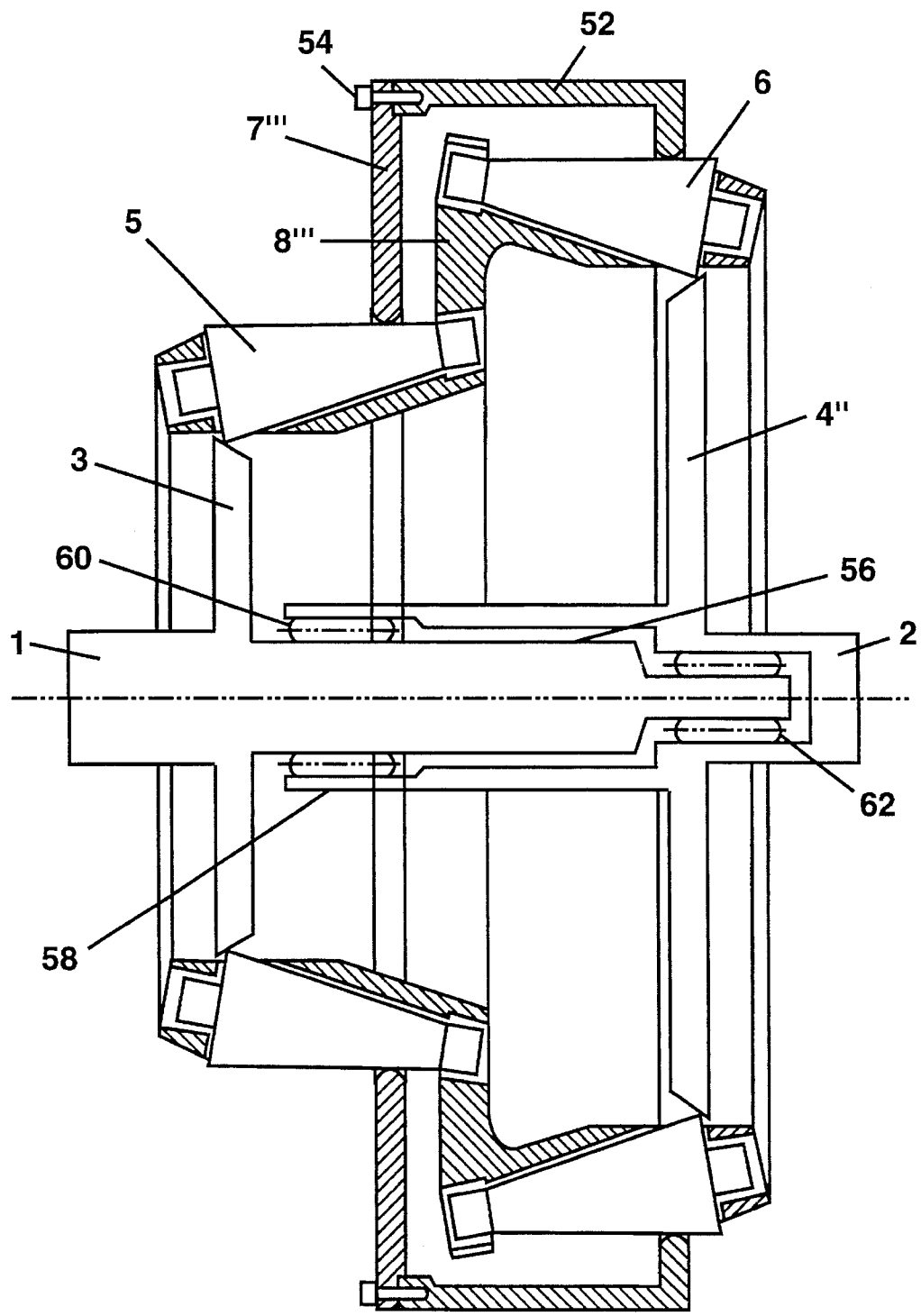
FIG. 6 shows a fourth embodiment of the present invention.

FIG. 6 shows another embodiment of the invention. The embodiment of FIG. 6 is a variation of FIG. 5 in which the second stage (disk 4" and a portion of the cage 8"' and transfer ring 7"') have larger diameters than the first stage. In this case, a significant reduction of traction forces can be achieved by kinematic gain, and additionally, a larger number of rollers 6 can be packaged around disk 4"' with further reduction of loads on the second stage.

As shown in the embodiment of FIG. 6, power transfer ring 7"' is formed from two pieces 50 and 52, which are connected with bolts 54. Alternatively, as discussed with respect to the embodiment of FIG. 5, the power transfer ring could be formed in one piece and the cage 8"' could be formed from two pieces.

As in the embodiment of FIG. 5, the power transfer ring 7"' of FIG. 6 has two axially spaced contact surfaces and is therefore inherently stable.

Also shown in FIG. 6 is an interconnection between the input shaft 1 and the output shaft 2. Input shaft 1 includes an extension 56 which has a first diameter less than that of the main portion of the shaft and a second diameter less than that of the first diameter. Output shaft 2 includes an extension 58 having a cavity receding beyond output disk 4" which telescopically receives the extension 56 of shaft 1. Bearing 60 is positioned between the shaft extensions at the first diameter and bearing 62 is positioned between the shaft extensions at the second diameter to maintain alignment of the input and output shafts. Bearings 60 and 62 allow the input and output shafts to rotate relative to one another and prevent radial displacement of the shafts relative to one another. However, bearings 60 and 62 allow axial movement of the shaft relative to each other to allow the transmission to be self aligning, as discussed in connection with FIG. 1. In other words, a spring 11, shown in FIG. 1, can be used in any of the embodiments in order to provide traction force and make all of the components of the transmission self-aligning. Bearings 60 and 62 must permit axial movement of shaft 2 in order to allow spring 11 force disk 4" toward disk 3.

It will be understood that many changes can be made within the scope of the present invention. For example, in the embodiments of FIGS. 4, 5 and 6 the number of output rollers can be different from the number of input rollers 5 in order to accommodate output torque requirements of the transmission. Or from the standpoint of contact stresses, in the embodiment of FIG. 4, race 36 provides a concave-convex point of contact which is superior to convex-convex contacts. With minor modifications, this type of arrangement can be applied to all the embodiments. These and other modifications are within the scope of this invention and are intended to be covered by the claims set forth below.

What is claimed is:

1. An apparatus comprising:

an input shaft having a first axis of rotation;

an output shaft having a second axis of rotation which is parallel to said first axis of rotation;

a first set of cones tapered in a first direction, each cone of said first set of cones having an axis of rotation oriented such that a portion of a surface thereof is parallel to a portion of the surface of every other cone of said first set of cones;

a second set of cones tapered in a second direction opposite to said first direction, each cone of said second set of cones having an axis of rotation oriented such that a portion of a surface thereof is parallel to a portion of the surface of every other cone of said second set of cones;

a power transfer ring which tractionally engages said first and second sets of cones on the parallel surface portions thereof to transfer power from said first set of cones to said second set of cones, said power transfer ring having an axis of rotation which is oblique relative to the axes of rotation of said first set of cones and the axes of rotation of said second set of cones and said power transfer ring being movable axially of said first and second sets of cones along said parallel surface portions to vary the power transfer ratio from said first set of cones to said second set of cones, said input shaft being in operative driving engagement with said first set of cones to cause rotation of said first set of cones when said input shaft rotates, and said second set of cones being in operative driving engagement with said output shaft to cause rotation of said output shaft when said second set of cones rotate.

2. An apparatus comprising:

an input shaft having a first axis of rotation;

an output shaft having a second axis of rotation which is parallel to said first axis of rotation;

a first set of cones tapered in a first direction, each cone of said first set of cones having an axis of rotation oriented such that a portion of a surface thereof is parallel to a portion of the surface of every other cone of said first set of cones;

a second set of cones tapered in a second direction opposite to said first direction, each cone of said second set of cones having an axis of rotation oriented such that a portion of a surface thereof is parallel to a portion of the surface of every other cone of said second set of cones;

a power transfer ring which tractionally engages said first and seconds sets of cones on the parallel surface portions thereof to transfer power from said first set of cones to said second set of cones, said power transfer ring having an axis of rotation which is oblique relative to the axes of rotation of said first set of cones and the axes of rotation of said second set of cones being movable axially of said first and second sets of cones along said parallel surface portions to vary the power transfer ratio from said first set of cones to said second set of cones, said input shaft being in operative driving engagement with said first set of cones to cause rotation of said first set of cones when said input shaft rotates, and said second set of cones being in operative driving engagement with said output shaft to cause rotation of said output shaft when said second set of cones rotate, wherein said parallel surface portions of said first set of cones describe a cylinder and said parallel surface portions of said second set of cones describe the same cylinder.

3. An apparatus comprising:

an input shaft having a first axis of rotation;

an output shaft having a second axis of rotation which is parallel to said first axis of rotation;

a first set of cones tapered in first direction, each cone of said first set of cones having an axis of rotation oriented such that a portion of a surface thereof is parallel to a portion of the surface of every other cone of said first set of cones;

a second set of cones tapered in a second direction opposite to said first direction, each cone of said second set of cones having an axis of rotation oriented such that a portion of a surface thereof is parallel to a portion of the surface of every other cone of said second set of cones;

a power transfer ring which tractionally engages said first and seconds sets of cones on the parallel surface portions thereof to transfer power from said first set of cones to said second set of cones, said power transfer ring having an axis of rotation which is oblique relative to the axes of rotation of said first set of cones and the axes of rotation of said second set of cones being movable axially of said first and second sets of cones along said parallel surface portions to vary the power transfer ratio from said first set of cones to said second set of cones, said input shaft being in operative driving engagement with said first set of cones to cause rotation of said first set of cones when said input shaft rotates, and said second set of cones being in operative driving engagement with said output shaft to cause rotation of said output shaft when said second set of cones rotate, wherein said parallel surface portions of said first set of cones describe a first cylinder and said parallel surface portions of said second set of cones describe a second cylinder having a diameter different from the diameter of said first cylinder.

4. An apparatus as claimed in claim 2 wherein said first set of cones is axially spaced from said second set of cones and said power transfer ring has a first contact surface in contact with said first set of a cones and a second contact surface in contact with said second set of cones, said first and second contact surfaces forming equal diameter circles.

5. An apparatus as claimed in claim 2 wherein said power transfer ring has a single circular contact surface which tractionally engages both said first set of cones and said second set of cones.

6. An apparatus as claimed in claim 3 wherein said first and second sets of cones are radially aligned and said power transfer ring has an inner surface which tractionally engages one of said sets and an outer surface which tractionally engages the other of said sets.

7. An apparatus as claimed in claim 3 wherein said first and second sets of cones are radially offset and axially offset and said power transfer ring has two offset contact surfaces.

8. An apparatus comprising:

an input shaft having a first axis of rotation;

an output shaft having a second axis of rotation which is parallel to said first axis of rotation;

a first set of cones tapered in a first direction, each cone of said first set of cones having an axis of rotation oriented such that a portion of a surface thereof is parallel to a portion of the surface of every other cone of said first set of cones;

a second set of cones tapered in a second direction opposite to said first direction, each cone of said second set of cones having an axis of rotation oriented such that a portion of a surface thereof is parallel to a portion of the surface of every other cone of said second set of cones;

a power transfer ring which tractionally engages said first and seconds sets of cones on the parallel surface portions thereof to transfer power from said first set of cones to said second set of cones, said power transfer ring having an axis of rotation which is oblique relative to the axes of rotation of said first set of cones and the axes of rotation of said second set of cones being movable axially of said first and second sets of cones along said parallel surface portions to vary the power transfer ratio from said first set of cones to said second set of cones, said input shaft being in operative driving engagement with said first set of cones to cause rotation of said first set of cones when said input shaft rotates, and said second set of cones being in operative driving engagement with said output shaft to cause rotation of said output shaft when said second set of cones rotate, further including a first disc attached to said input shaft and a second disc attached to said output shaft, said first set of cones tractionally engaging said first disc and said second set of cones tractionally engaging said second disc.

9. An apparatus comprising:

an input shaft having a first axis of rotation;

an output shaft having a second axis of rotation which is parallel to said first axis of rotation;

a first set of cones tapered in a first direction, each cone of said first set of cones having an axis of rotation oriented such that a portion of a surface thereof is parallel to a portion of the surface of every other cone of said first set of cones;

a second set of cones tapered in a second direction opposite to said first direction, each cone of said second set of cones having an axis of rotation oriented such that a portion of a surface thereof is parallel to a portion of the surface of every other cone of said second set of cones;

a power transfer ring which tractionally engages said first and seconds sets of cones on the parallel surface portions thereof to transfer power from said first set of cones to said second set of cones, said power transfer ring having an axis of rotation which is oblique relative to the axes of rotation of said first set of cones and the axes of rotation of said second set of cones being movable axially of said first and second sets of cones along said parallel surface portions to vary the power transfer ratio from said first set of cones to said second set of cones, said input shaft being in operative driving engagement with said first set of cones to cause rotation of said first set of cones when said input shaft rotates, and said second set of cones being in operative driving engagement with said output shaft to cause rotation of said output shaft when said second set of cones rotate, wherein said first and second sets of cones are mounted respectively in first and second carriers.

10. An apparatus as claimed in claim 9 wherein said first and second carriers are fixedly mounted.

11. An apparatus as claimed in claim 10 wherein said first and second carriers are rotatably mounted.

12. An apparatus as claimed in claim 8 including means for biasing said first and second discs together.

13. An apparatus as claimed in claim 8 wherein each of said cones has a base edge, the base edges of said cones being in tractional contact with said disks.

14. An apparatus as claimed in claim 12 wherein said means for biasing comprises a bearing having a first race mounted on one of said discs and a second race biased toward said first race by a spring.

15. An apparatus as claimed in claim 12 wherein said disks and cones have axially applied tractional contacts generated by said biasing means.

16. An apparatus, comprising:

a plurality of first tapered rollers spaced in a circle;

a plurality of second tapered rollers spaced in a circle;

means for tractionally engaging said first and second tapered rollers to cause said second tapered rollers to rotate in response to rotation of said first tapered rollers;

a first shaft having a conical portion engaging each of said first tapered rollers; and a second shaft having a conical portion engaging each of said second tapered rollers.

17. An apparatus according to claim 16 wherein said means for tractionally engaging said first and second rollers comprises a ring and said first and second tapered rollers are oriented such that said ring contacts each roller and can move axially along said rollers and remain in contact with each roller.

18. An apparatus according to claim 16 wherein said first and second tapered rollers alternate in a common circle and are tapered in opposite directions.

19. An apparatus according to claim 17 wherein said ring has one circular surface which contacts each of said rollers.

20. An apparatus according to claim 17 wherein said ring has two circular surfaces, one of which contacts said first tapered rollers and the other of which contacts said second tapered rollers.

21. An apparatus according to claim 20 wherein one of said circular surfaces faces radially inward of said ring and the other of said circular surfaces faces radially outward of said ring.

22. An apparatus according to claim 20 wherein both of said circular surfaces face radially inward.

* * * * *